United States Patent [19]

Akanabe et al.

[11] 4,432,598
[45] Feb. 21, 1984

[54] IMAGE READING AND RECORDING APPARATUS AND PHOTODEFLECTOR THEREFOR

[75] Inventors: Yuichi Akanabe; Hiroaki Ikeda; Masatoshi Maeda; Shinsuke Funaki, all of Hino, Japan

[73] Assignee: Konishiroku Photo Industry Co., Ltd., Tokyo, Japan

[21] Appl. No.: 265,350

[22] Filed: May 19, 1981

[30] Foreign Application Priority Data

May 22, 1980 [JP] Japan ............................... 55-67098

[51] Int. Cl.³ ............................................. G02B 27/17
[52] U.S. Cl. ............................................. 350/6.7
[58] Field of Search ................................... 350/6.7

[56] References Cited

U.S. PATENT DOCUMENTS

| 3,040,627 | 6/1962 | Bohn et al. | 350/6.7 |
| 3,360,659 | 12/1967 | Young | 350/6.7 |
| 4,067,021 | 1/1978 | Baylis et al. | 350/6.7 |
| 4,084,197 | 4/1978 | Starkweather | 350/6.7 |

Primary Examiner—John K. Corbin
Assistant Examiner—Rebecca D. Gass
Attorney, Agent, or Firm—Jordan B. Bierman; Linda Bierman

[57] ABSTRACT

A multi-faceted photodeflector includes a plurality of groups of multiple mirrors circumferentially alternating about a rotation axis, each group consisting of the same number of mirrors. Each mirror of any particular one of the mirror groups is inclined, with respect to the rotation axis, at an angle different than the mirrors of all other mirror groups disposed about the rotation axis.

8 Claims, 2 Drawing Figures

IMAGE READING AND RECORDING APPARATUS AND PHOTODEFLECTOR THEREFOR

The present invention relates to a device for switching the paths of light beams for reading out and writing in, particularly to a photodeflector functioning as a switching device, in an equipment reading out and writing in by the light beam scanning.

Recently in facsimiles, large sized displays, copying machines, etc., there have been using the equipments which are made both reading out and recording (displaying) originals perform by scanning with light beams such as laser beams.

In such equipments, it is usual that the beams for reading out and the beams for recording or for displaying being modulated by image forming signals obtained from reading out, are scanned by the same photodeflector.

As for the method for scanning two kinds of beams through the use of the same photodeflector, there are the methods that the respective light beams are used for reading out and writing in and the incidence of each beam is made on the same rotatable mirror at the different angles respectively, and that the incidence of each beam is made on the different surfaces of said rotatable mirror respectively. However, those methods require the separate optical systems according to the respective beams, and thus would make the device thereof complicate and also make the adjustments of said optical systems troublesome.

To cope therewith, a variety of methods have been proposed so as to make the incident beams into a single beam for two way use, and to make said single beam into separation beams after passing through the photodeflector, however there have been many defects in all the cases. That is to say concretely, in the method utilizing zero-phase-sequence-light not being modulated and primary-phase-sequence diffraction light being modulated through the use of an acoustic optical modulator, the preciseness of the optical system adjustments is required because of the fact that the deflection angles of said two beams are small in general, that are usually within only some tens of m rad. In the method of arranging reflection mirrors behind a photodeflector and switching the light paths by moving said mirrors mechanically, it is difficult to speed up the switching of the light paths and also to relocate said mirrors to the fixed position with a high accuracy. In the method that the direction of light beam deflection is switched by an electrooptical effects and further that the choice of the light beams to be either reflected or transmitted through a polarizing prism (e.g., Glen-Thompson prism) utilizing multiple refraction, electrooptic effect elements and multiple refraction prisms are expensive in price and in addition it is required to turn on and off a high tension voltage that produces electrooptic effect. In the method that beams being mixed with the rays of light each of which having different wave lengths from each other and, mixture and separation of the rays of light are performed through the use of dichroic mirrors, there is a fundamental defect that the light beam separation cannot be performed perfectly according as said dichroic mirrors function, and besides, it would become expensive in price if a plurality of light sources such as lasers are used. Further, there is also the method that the rays of light are separated by using a single light source and half-mirrors only, wherein it is however impossible to seperate the beams for reading out and those for writing in from each other, and also it necessitates to have an exceedingly wide angle modulator, because the optical modulator for writing in has to be arranged behind the place where the beams are scanned by a photodeflector and then are reflected on the half-mirrors.

The present invention is to provide a photodeflector, wherein rotatable multiple mirrors are used as a photodeflector whose reflection surfaces are divided into a plurality of groups thereof, and the angle of each group to the rotation axle of the rotatable multiple mirrors is changed respectively to the other, and then the light beam scanning and the light path separation are made to simultaneously perform, and thereby the aforesaid defects are included therein.

BRIEF DESCRIPIONS OF THE DRAWINGS

Figure 1:
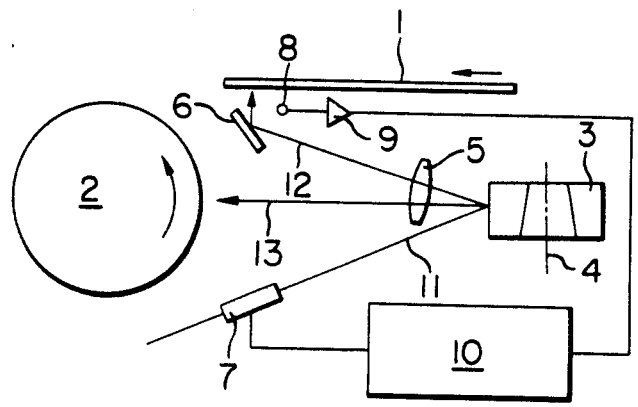
FIG. 1 is an illustration diagram of one exemplary construction of an image reading out and reading equipment using the photodeflector of the invention.

Referring to the drawings, FIG. 1 shows one of the exemplary embodiments of the invention, wherein the numeral 1 designates an original for reading out which is scanned by rotatable multiple mirrors 3 vertically to the paper sheet and at the same time transported in the direction of the arrow that serves as sub-scanning. Numeral 2 is a photosensitive substance such as an electrostatically recording substance, which is scanned by the light beams in the direction of the generating line of the cylinder of said photosensitive substance with synchronizing with the transportation of original 1 and rotating in the direction of the arrow.

Figure 2:
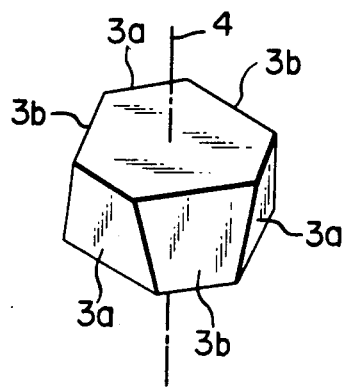
FIG. 2 is a perspective view of one of the exemplary embodiments of the photodeflectors of the invention.

Numeral 3 is a rotatable multiple mirror, and as shown in FIG. 2, two pairs of reflection surfaces, 3a and 3b, being alternately arranged with each other, are inclined by the same degree of angle oppsedly facing each other against rotation axle 4.

Numeral 5 is a condenser lens comprising one or a plurality of lenses. 6 is a reflection mirror having two functions that the suitable arrangements of original 1 and photosensitive substance 2 can be determined from the viewpoint of machine structure as a whole and that an image signal can be bilaterally reversed to an original on the photosensitive substance. 7 is a photomodulator, 8 is a photodetector, 9 is an amplifier, 10 is a buffer-memory retaining once an image signal having been read out by photodetector 8 therein. Further, 11 is an incident beam, 12 is a beam for reading out and 13 is a beam for writing in.

The equipment of this exemplary embodiment is constituted as mentioned above, therefore, when this equipment is used as a copying machine, light beam 11 from a light souce that is not shown in the drawings hereof is reflected on rotatable multiple mirrors 3b without being modulated by photomodulator 7, and the reflection light 12 focuses in on a spot on original 1 through condenser lens 5 and reflection mirrors 6. The said spot is scanned in the vertical direction of paper sheet over the original by the rotation of rotatable multiple mirrors 3. The reflected light from original 1 is detected as an image information by photodetector 8, and then retained once in buffer memory 10 through amplifier 9. When rotatable multiple mirrors 3 rotate and light beam 11 hits reflection surface 3a, the reflected light is switched into light path 13 and scans over photosensitive substance 2. Photomodulator 7 is started its operation by an image information synchronously memorized in buffer memory 10 with the light path switching, and there is formed the same image on photosensitive substance 2 as that detected on photosensitive substance 2 by photodetector 8.

In the exemplary embodiment shown in FIG. 2, two pairs of reflection surfaces, 3a and 3b, are inclined opposedly to rotation axle 4 with the same degree of angle, however the invention is not limited thereby, whenever the angle of inclination of each surface of each group is the same.

In case of the exemplary embodiment shown in FIG. 1, the angles of light paths 12 and 13 are determined according to the angle between the reflection surfaces 3a and 3b, therefore it is better to separate two light paths from each other to the degree that the arrangements and adjustments of optical systems 5, 6 and 7, etc. can easily done, and in case of two light paths in this exemplary embodiments, it is desirable to narrow the separation angle to the degree that condenser lens 5 can be commonly used for.

In addition to the above, when the memory capacity of buffer memory 10 is increased, a variety of design changes within the scope of the invention are feasible, for example, reflection surfaces, 3a and 3b, are arranged not alternately but sucessively with three of each type of surfaces and, memory and recording are made on every three scanning lines, or, reflection surfaces surfaces are divided into three groups, 3a, 3b, and 3c, one group out of which is used for reading out an image, the other group for recording and the remaining group for displaying. Also, it is needless to say that not only rotatable reflection mirrors having six mirrors, but also those having eight mirrors, or nine mirrors as the case may be, and so on, can be appropriately used.

We claim:

1. A photodeflector for a scanning device, comprising a plurality of groups of multiple mirrors circumferentially alternating around a rotation axis, each of said groups consisting of the same number of mirrors and each of said mirrors of a particular one of said groups being disposed so that its surface is inclined, with respect to said rotation axis, at the same angle as the other mirrors of that group and at a different angle from the mirrors of all other mirror groups disposed about said axis.

2. A photodeflector in accordance with claim 1 and having two groups of mirrors.

3. A photodeflector in accordance with claim 2, wherein said mirrors of the first group and said mirrors of the second group are disposed at complementary angles with respect to said rotation axis.

4. A photodeflector in accordance with claim 3, wherein each of said mirror groups comprises three mirrors.

5. A photodeflector in accordance with claim 2, wherein each of said mirror groups comprises three mirrors.

6. A photodeflector in accordance with claim 1, wherein each of said mirror groups comprises three mirrors.

7. A photodeflector in accordance with claim 1, wherein the mirrors of each group are positioned at regularly spaced intervals about said rotation axis.

8. An image reading and recording apparatus, comprising:
a rotatable photodeflector formed of a plurality of groups of multiple mirrors circumferentially alternating around a rotation axis, each of said groups consisting of the same number of mirrors and each of said mirrors of a particular one of said groups being disposed so that its surface is inclined, with respect to said rotation axis, at the same angle as the other mirrors of that group and at a different angle from the mirrors of all other groups disposed about said axis;
means for projecting a light beam at said photodeflector for reflection therefrom;
a photodeflector for receiving light reflected from an original by said photodeflector and for producing an output signal in accordance with the light received;
a photosensitive element for receiving a latent image of the original;
a memory for storing signals received from said photodetector; and
a photomodulator for modulating the light beam projected at said photodeflector in accordance with signals stored by said memory for producing a latent image of the original on said photosensitive elements;
such that the light beam projected at said photodeflector is reflected from one of the groups of mirrors thereof onto the original for imaging the same, and is reflected by another group of mirrors of said photodeflector onto said photosensitive element to produce thereon a latent image of the original.

* * * * *